United States Patent [19]

Anderson

[11] Patent Number: 5,100,286
[45] Date of Patent: Mar. 31, 1992

[54] ROBOTIC APPARATUS

[75] Inventor: Roger Anderson, Ridgefield, Conn.

[73] Assignee: Robotic Originals, Inc., Danbury, Conn.

[21] Appl. No.: 673,852

[22] Filed: Mar. 21, 1991

Related U.S. Application Data

[63] Continuation of Ser. No. 404,942, Sep. 8, 1989, abandoned.

[51] Int. Cl.$^5$ ............................................. B25J 9/08
[52] U.S. Cl. .................................... 414/749; 901/16; 901/21; 901/27
[58] Field of Search ............... 414/749, 751; 901/16, 901/21, 27

[56] References Cited

U.S. PATENT DOCUMENTS

| | | | |
|---|---|---|---|
| 3,901,392 | 8/1975 | Streckert | 901/16 X |
| 4,457,661 | 7/1984 | Flint et al. | 414/417 X |
| 4,597,707 | 7/1986 | Cornacchia | 901/16 X |
| 4,610,595 | 9/1986 | Hockersmith et al. | 414/749 X |

FOREIGN PATENT DOCUMENTS

| | | | |
|---|---|---|---|
| 0290796 | 11/1988 | European Pat. Off. | 901/21 |
| 0310481 | 4/1989 | European Pat. Off. | 901/16 |
| 2442781 | 8/1980 | France | 901/21 |
| 0009704 | 1/1986 | Japan | 901/16 |
| 0188329 | 8/1986 | Japan | 414/751 |
| 1310199 | 5/1987 | U.S.S.R. | 901/21 |
| 2143205 | 2/1985 | United Kingdom | 901/16 |
| 2176168 | 12/1986 | United Kingdom | 901/16 |

Primary Examiner—Robert J. Spar
Assistant Examiner—William M. Hienz
Attorney, Agent, or Firm—Schweitzer Cornman & Gross

[57] ABSTRACT

A robotic apparatus, and components thereof, which is characterized by a high degree of modularity, enabling complex robotic mechanisms to be assembled on a customized basis from relatively standardized components on an efficient and economical basis. Individual numbers of a multi-axis device may be comprised of inverted channel-like support members, cut to predetermined length and provided at the extremities of their flange walls with opposed, longitudinally extending track strips. A movable carriage mounts series of guide rollers engageable with and guided and confined by the track strips for movement along a predetermined axis defined by the support member. A drive sprocket, driving by a digitally controlled stepping motor, with a drive sprocket, is mounted at one end of the support member and an idler sprocket at the opposite end. A discontinuous length of gear belt material is trained about the sprockets and clamped at each end to the travelling carriage, whereby the carriage may be precisely positioned on its support member by controlled step-wise rotation of the drive motor. A plurality of such component units may be assembled in a cascade fashion, with the support member of one stage mounted by the movable carriage of the previous stage. The successive stages may be mounted at right angles, to provide for manipulated motion along a combination of X-Y-Z axes, for example, or some of the units may be disposed at different angles.

4 Claims, 3 Drawing Sheets

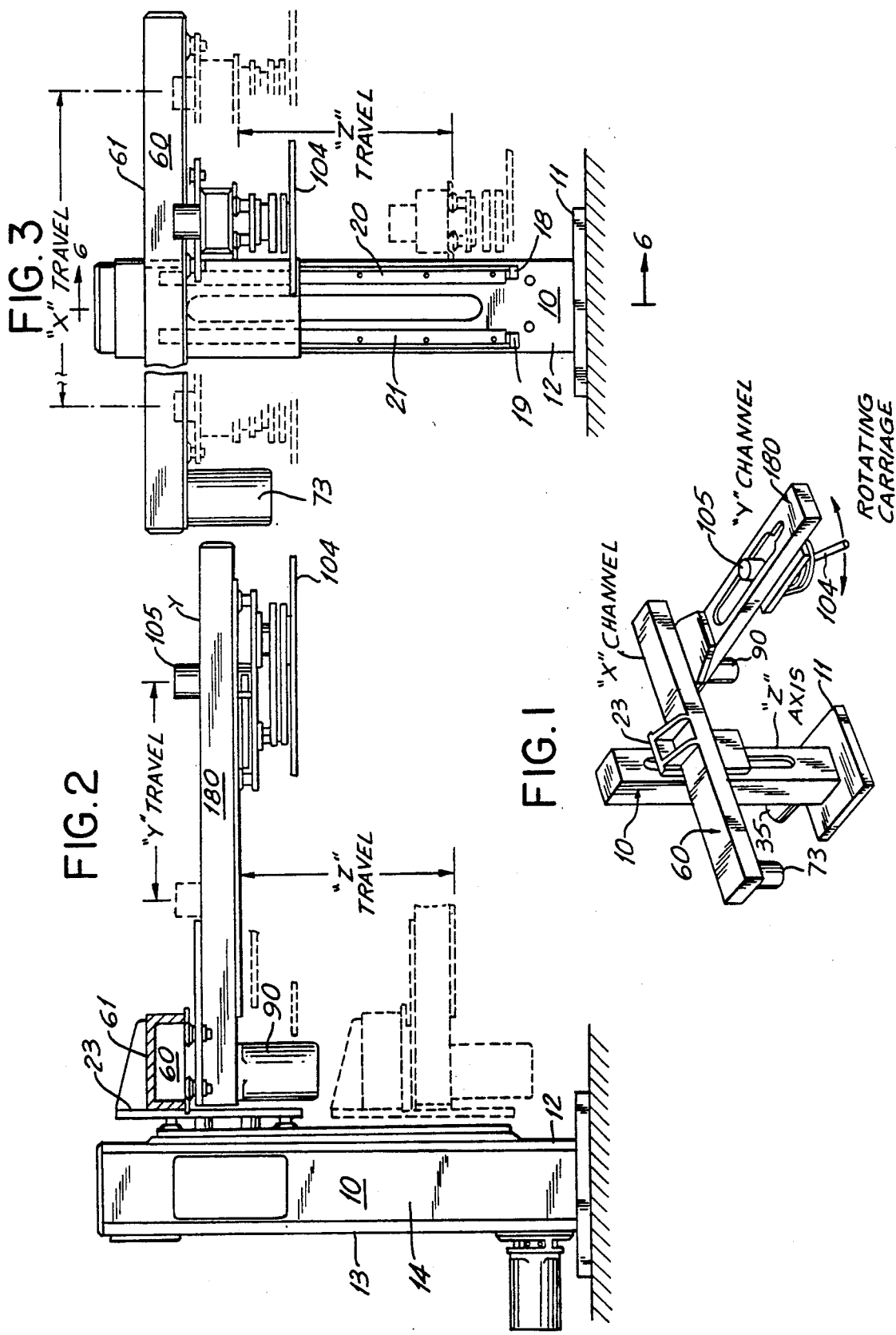

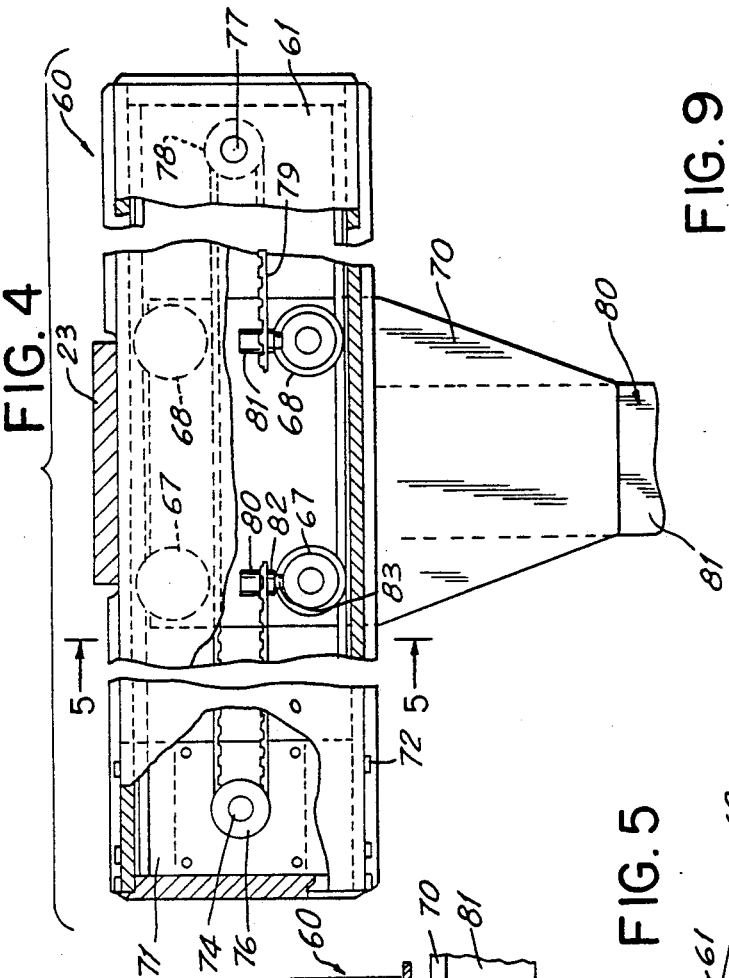
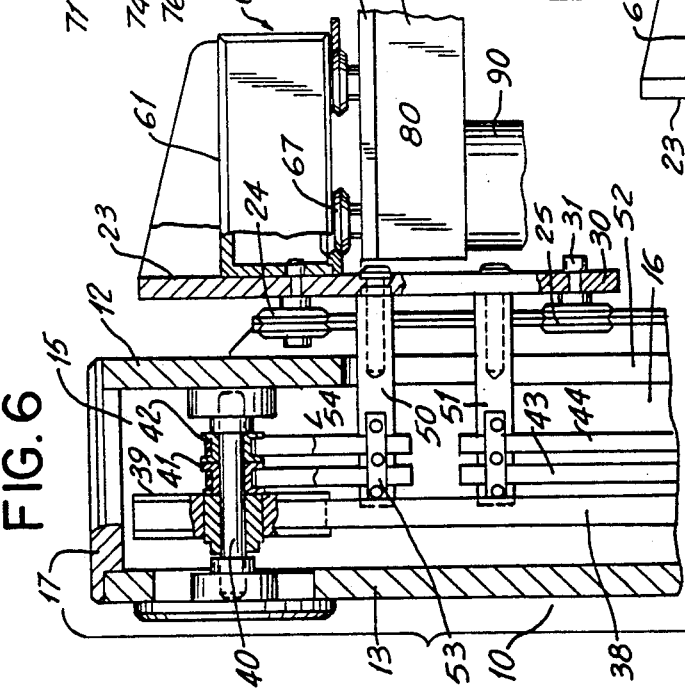
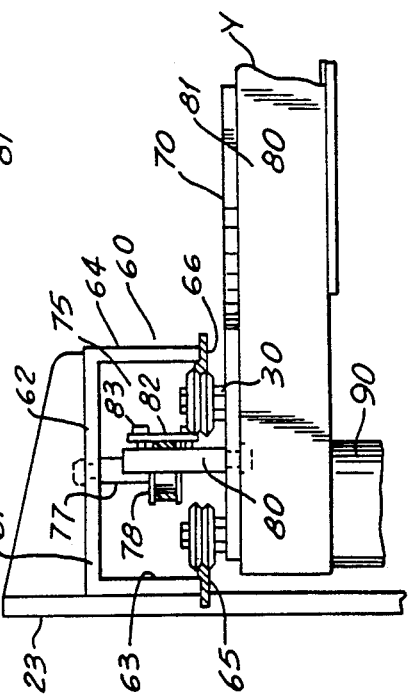

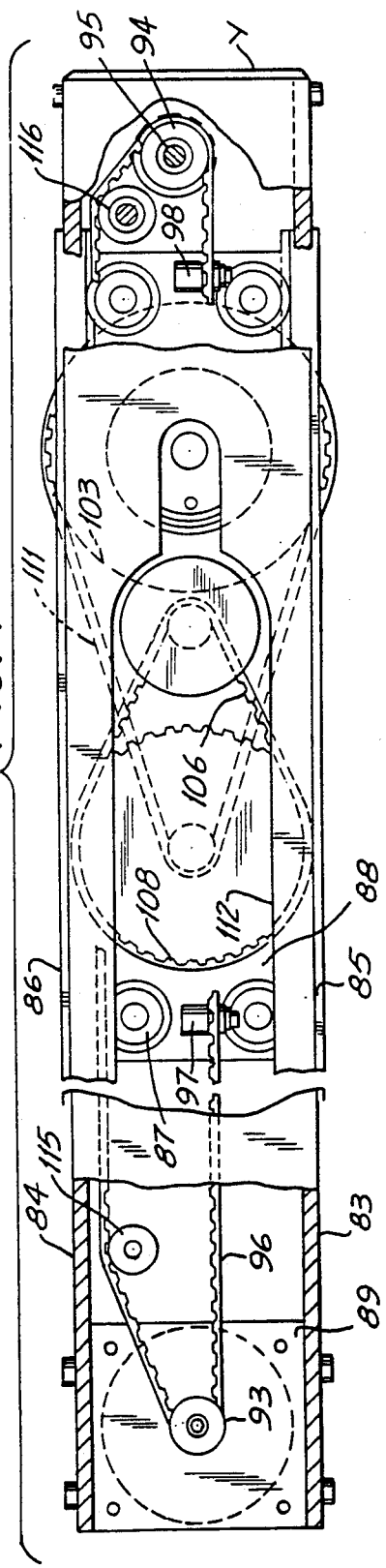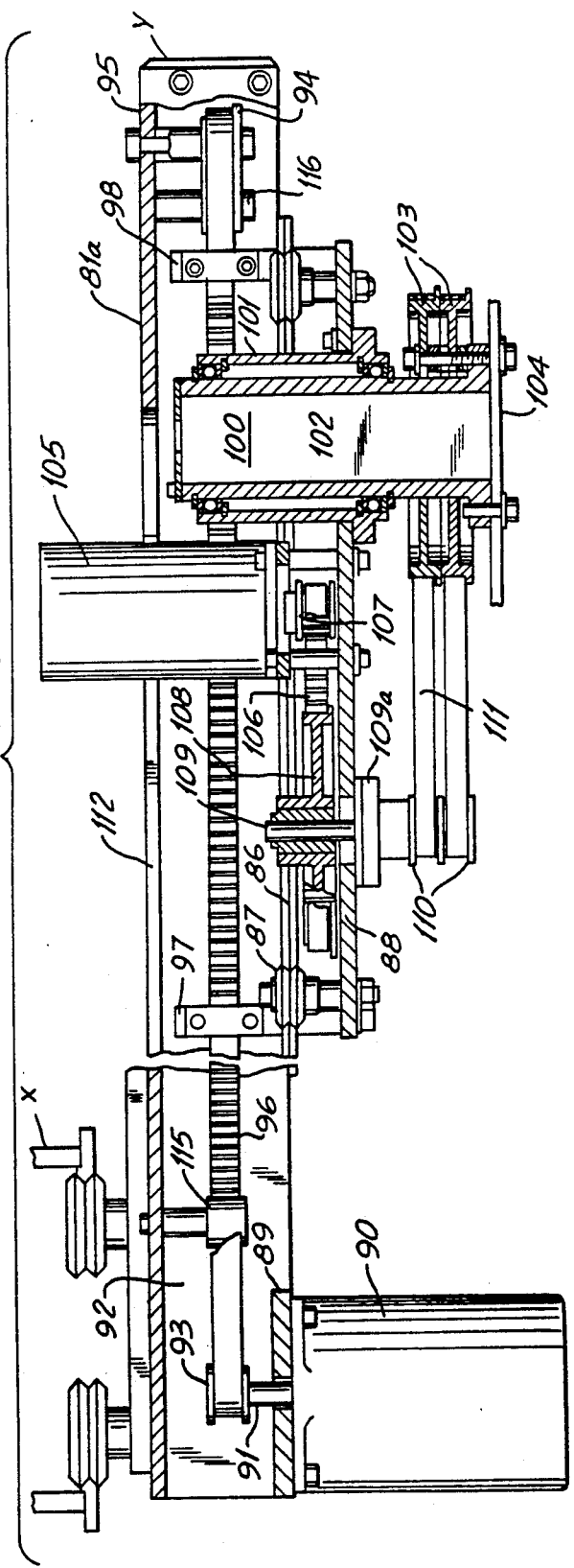

ROBOTIC APPARATUS

This is a continuation of application Ser. No. 07/404,942, filed Sept. 8, 1989, now abandoned.

BACKGROUND AND SUMMARY OF THE INVENTION

To a large and continually increasing extent, manufacturing operations are being automated to reduce the amount of manual labor required to perform simple, repetitive activities. For example, programmable robotic apparatuses are widely used for operations requiring pick up, transporting and depositing of items, with or without reorientation of the transported item. Robotic devices for such purposes are well known and are commercially available from many sources. However, the economics of utilizing robotic devices is unfavorable for many operations, because of the significant capital expense involved in the acquisition and installation of commercially available equipment.

A primary feature of the present invention is the provision of a fully functional robotic apparatus which is of unusually simplified, modular design and is capable of being manufactured and installed both quickly and inexpensively. The equipment is thus ideally suited for many tasks heretofore considered marginal for robotic automation.

The apparatus of the invention employs a novel arrangement of rectilinear structural elements to provide for controlled motion along so-called X, Y and Z axes, as well as providing for rotational reorientation. The arrangement is such that a robotic apparatus may be easily assembled to perform a designated task or groups of tasks, by assembling largely standardized components. In the case of the basic, rectilinear components, they may be cut to length and assembled in a standardized fashion, utilizing standardized components, but yet comprising a finished apparatus which is significantly customized to the particular end use desired.

In one of its most advantageous forms, the robotic apparatus of the invention includes a vertical supporting pillar provided with opposed, V-shaped guide tracks for engaging correspondingly grooved guide wheels carried by a Z-axis carriage. The Z-axis carriage mounts a horizontally disposed, preferably inverted channel member extending in the direction of the X-axis. The X-axis channel is provided with opposed, V-shaped guide tracks similar to those of the Z-axis pillar, which engage correspondingly grooved wheel sets mounted on an X-axis carriage. The X-axis carriage in turn mounts a second horizontally disposed inverted channel, extending along the so-called Y-axis, at right angles to the direction of the X-axis. The Y-axis channel is constructed generally in the same manner as the X-axis channel and mounts a Y-axis carriage for controlled movement along the length of the Y-axis support. The Y-axis carriage mounts a gripping or similar device for engaging a product or item to be transported, and typically includes means for rotating the part about a predetermined axis.

In a robotic apparatus, precision manipulation of the product is generally essential. To this end, the apparatus of the invention includes uniquely advantageous, highly simplified and economical drive arrangements which enable the desired high precision control through digitally controlled drive motors and an advantageous arrangement of gear belt drives used in conjunction therewith.

For a more complete understanding of the above and other features and advantages of the invention, reference should be made to the following detailed description of a preferred embodiment of the invention and to the accompanying drawings.

DESCRIPTION OF THE DRAWINGS

FIG. 1 is a schematic, perspective illustration of an advantageous form of robotic apparatus constructed in accordance with the teachings of the invention.

FIG. 2 is a side elevational view of the robotic apparatus of FIG. 1.

FIG. 3 is a front elevational view of the apparatus of FIG. 1.

FIG. 4 is a top plan view of the X-axis support of the apparatus in FIG. 1, partly in section and with parts broken away to show certain internal details.

FIG. 5 is a cross sectional view as taken generally on line 5—5 of FIG. 4.

FIG. 6 is a cross sectional view as taken generally on line 6—6 of FIG. 3.

FIG. 7 is a top plan view, similar to FIG. 4, showing details of construction of the Y-axis support.

FIG. 8 is a longitudinal cross sectional view of the Y-axis support and mechanism supported thereby.

FIG. 9 is an enlarged, fragmentary view illustrating arrangements for mounting of the grooved support wheels on the respective X, Y and Z carriages.

DESCRIPTION OF A PREFERRED EMBODIMENT OF THE INVENTION

Referring now to the drawings, the reference numeral 10 designates generally a vertical pillar constituting the Z-axis support for the apparatus of the invention. In the illustrated construction, the pillar 10 is mounted rigidly on a plate 11, which can be secured to a suitable foundation. The support comprises front and back walls 12, 13 and connecting side walls 14, 15 defining an elongated vertical cavity 16 closed at the top by a cap 17. The cavity 16 houses the Z-axis drive mechanism, to be further described.

On the front wall 12 of the Z-axis support are spaced, vertically extending spacer rails 18, 19, to which are bolted track strips 20, 21 (see FIGS. 6, 3). In the illustrated form of the invention, the track strips 20, 21 are elongated, relatively thin strips of hardened and ground steel formed with an externally V-shaped contour along one edge 22 (see FIG. 9). These strips are mounted in opposed, uniformly spaced parallel relation on the rails 18, 19, with the V-contoured edges facing each other.

A Z-axis carriage, comprising in the illustrated case a generally rectangular plate 23, mounts upper and lower pairs of grooved wheel assemblies 24, 25. Each of the pairs of wheel assemblies 24, 25 is arranged to engage the track strips 20, 21 in a snug fashion, such that the wheel pairs guide the Z-axis carriage 23 smoothly and accurately in vertical movements along the Z-axis support.

As reflected in FIG. 9 in particular, the wheel assemblies 24, 25 are advantageously comprised of individual wheels 26, 27 of generally flat form and having V-shaped external configuration, as reflected at 28. Such wheels are conventionally available and need not be custom manufactured. Pursuant to the invention, two such wheels, when secured together, define between them a V-shaped groove 29 arranged to receive and be guided and confined by the V-shaped edges 22 of the track strips 20, 21.

Advantageously, each set of wheels 24, 25 is mounted on the carriage 23 by a post 30 secured to the carriage plate by a bolt 31 and arranged to receive a wheel-mounting bolt 32 on an axis slightly offset from the axis of the bolt 31. Accordingly, when the Z-axis carriage 23 is being installed on the track strips 20, 21, a degree of lateral wheel axis adjustment is provided through rotation of the wheel supporting posts 30, assuring a precision snugness of the opposed wheel pairs with their respective track strips. When properly adjusted, the posts 30 are tightly secured by the bolts 31.

Motion control for the Z-axis carriage 23 is provided by a drive motor 35 mounted on the back wall 13 of the Z-axis support and arranged with its output shaft 36 extending into the cavity 16. The motor 35 is of a type, in itself well known, which is capable of precision incremental rotation pursuant to digital control input means which, per se, do not form part of the present invention. The motor shaft 36 mounts a drive sprocket 37 driving a gear belt 38 which in turn drives a sprocket 39 fixed to an upper shaft 40 journaled in the upper portion of the Z-axis support. Also fixed to the upper shaft 40 are two small diameter sprockets 41, 42 driving parallel gear belts 43, 44. These belts are also trained about idler sprockets 45, 46, which are freely rotatable on the drive shaft 36.

In the illustrated arrangement, the drive sprocket 36 is of relatively small diameter in relation to the upper sprocket 39 to provide for mechanical advantage and speed reduction. In addition, the upper driving sprockets 41, 42, being of smaller diameter than the sprocket 39, provide for further speed reduction and mechanical advantage.

As reflected particularly in FIG. 6, a Z-axis carriage plate 23 mounts a pair of spaced tension posts 50, 51 which project through a longitudinal slot 52 in the front wall 12 of the Z-axis support. The tension posts project into the recess 16, across the tracking paths of the gear belts 43, 44. Each post has a clamping plate 53 thereon, secured by bolts 54, by means of which the gear belts 43, 44 may be secured to the respective tension posts. In this respect, the gear belts 43, 44 advantageously are of discontinuous, rather than endless, construction, with one end of each belt being secured to one of the tension posts 50, 51. At least one end of each belt, and preferably both, is arranged to be adjustably clamped to its tension post. This has two significant advantages: One, the belting material may be procured in a continuous length and simply cut to size at the time of fabrication of the robotic device. Thus, even though the robotic devices can be designed with custom dimensions, it is unnecessary to provide an extensive inventory of belt sizes and/or to provide for complicated routing of the belts in order to achieve a proper fit. In addition, the described arrangement enables belt tension to be adjusted and maintained without requiring the use of additional tension rollers to be installed in the apparatus.

Pursuant to the invention, an X-axis support member, generally designated by the reference numeral 60, is mounted horizontally by the Z-axis carriage plate 23. For this purpose, the Z-axis carriage 23 may include support brackets extending over the top of the support member 60 and secured thereto by bolts or other means.

To particular advantage, the X-axis support member 60 is configured in the form of an elongated member 61 of inverted channel cross section, including a central web wall 62 and spaced, downwardly projecting flange walls 63, 64 joined to the side edges of the web wall 62. The channel member 61 is formed of or cut to a length appropriate for the tasks to be performed by the particular apparatus and, in the illustrated example, is mounted symmetrically by the Z-axis carriage plate 23, with approximately half the length of the channel extending laterally to either side of the carriage.

Extending throughout the working length of the X-axis channel 61 are spaced, opposed track strips 65, 66, formed of hardened and ground steel and of a V-shaped configuration similar to that shown and described with respect to FIG. 9. The track strips 65, 66 advantageously are bolted directly to the respective flange walls 63, 64 of the X-axis channel 61 and are arranged for cooperation with grooved roller assemblies 67, 68, arranged in spaced pairs, mounted on an X-axis carriage plate 70 as shown particularly in FIGS. 4 and 5. The construction and mounting of the grooved roller pairs 67, 68 is in general the same as that described with respect to FIG. 9.

At one end of the X-axis channel there is a mounting plate 71, secured to the flange walls 63, 64 by bolts 72. The plate serves to mount an X-axis drive motor 73, the output shaft 74 of which projects into the recess 75 of the X-axis channel and mounts a drive sprocket 76. At the opposite end of the channel member 61 is a shaft 77, which is fixed in and projects downwardly from the web wall 62. The shaft 77 mounts an idler sprocket 78. A discontinuous gear belt 79 is trained about the drive sprocket 76 and idler 78 and is secured at its ends to tension posts 80, 81 projecting upwardly from the X-axis carriage plate 70. The ends of the gear belt 79 are secured to the tension posts by means of clamping bars 82, secured by bolts 83a, in essentially the same manner as the belts 43, 44 of the Z-axis assembly. The X-axis drive motor 13, as the Z-axis motor 35, is desirably a digitally controlled stepping motor arranged in response to the input of a predetermined number of electrical pulses to rotate through a corresponding number of angular increments, bidirectionally, to enable precision positioning along the X-axis channel member 61 of the X-axis carriage plate 70.

In the illustrated form of the invention, the X-axis carriage plate 70 rigidly mounts a Y-axis support assembly, generally designated by the numeral 180, which includes an inverted, elongated channel member 181 extending at right angles to the X-axis channel member 61. The Y-axis channel member is of generally the same type of construction as the X-axis channel, including a central web wall 81a and opposite side flange walls 83, 84 extending downward from the web wall. The respective flange walls 83, 84 support track strips 85, 86 engaging wheel assemblies 87 mounted on a Y-axis carriage 88, and serving to support and guide the Y-axis carriage member for confined movement along the Y-axis direction, within the longitudinal limits of the Y-axis channel member 181. In general, the basic structural features of the Y-axis support assembly are similar to those of the X-axis support assembly, as regards the construction of the channel member 181, the track strips 85, 86 and the guide wheels 87. The Y-axis channel member can be cut to any suitable length appropriate to the task required.

Adjacent the inner end of the channel member 181, a mounting plate 89 is bolted to the flange walls 83, 84 and serves to mount a drive motor 90, which is also a digitally controlled stepping motor 90 adapted for precision controlled incremental rotation in a bidirectional manner. The drive shaft 91 of the motor extends into the recess 92 of the Y-axis channel member and mounts a drive sprocket 93. An idler sprocket 94 is mounted at the opposite end of the Y-axis channel, by means of a shaft 95 extending downward from the web wall 81a of the channel. A discontinuous gear belt 96 is trained about the sprockets 93, 94 and is secured at its opposite ends to tension posts 97, 98, the construction and purpose of which is the same as that described with respect to the X-axis mechanisms.

As reflected particularly in FIGS. 7 and 8, the Y-axis carriage 88 mounts a rotary apparatus, generally designated by the reference numeral 100, for rotational manipulation of a part or object being transported or manipulated by the robotic apparatus. To this end, the carriage mounts a tubular bearing housing 101 which supports and antifrictionally journals a tubular output shaft 102. The output shaft extends below the carriage plate 88 and carries dual sprockets 103. The output shaft 102 may have secured to it any suitable device desired to be manipulated, such as a tool, part gripper or the like. In the specific illustration, a mounting plate 104 is secured to the rotary output shaft 102, and this plate is adapted to mount a product gripper, especially of the type shown and described in my copending application Ser. No. 405,634, filed Sept. 8, 1989, for "LIGHTWEIGHT GRIPPER FOR ROBOTIC TRANSFER OPERATIONS".

Controlled rotational orientation of the tubular output shaft 102 is provided by means of a digitally controlled $\theta$-axis stepping motor 105, which is mounted rigidly on the Y-axis carriage plate 88 and drives a gear belt 106 via the motor output sprocket 107. The gear belt 106 drives a large diameter sprocket 108 mounted on a shaft 109 supported by a bearing 109a mounted on the Y-axis carriage. The opposite end of the shaft 109 carries dual drive sprockets 110 which drive belts 111 trained about the before mentioned dual sprockets 103.

Because of the size of the $\theta$-axis axis motor 105 in relation to the Y-axis channel 181, it is advantageous to provide a longitudinally extending slot 112 in the web wall of the Y-axis channel, to enable the motor 105 to project upwardly through the web wall, while accommodating the necessary translational movement of the carriage 88 along the Y-axis.

As is evident in FIGS. 7 and 8, because of the presence of the $\theta$-axis axis drive motor 105 projecting into and through the channel recess 92, the drive belt 96 is diverted along one side of the Y-axis channel, by means of idler sprockets 115, 116, in order to avoid interference with the $\theta$-axis drive motor.

In the operation of the illustrated apparatus, each of the drive motors is separately controlled by means of power cords (not shown) leading thereto from a control source (not shown). In the typical case, the control source will include programmable digital control means, in themselves well known, by which the individual drive motors may be caused to execute a predetermined rotation, with a high degree of precision, so that the several movable carriages and the rotary mounting plate 104 may be actuated through precisely controlled movements. Typically, this enables the rotary mounting plate 104 to be moved from a first position, in a first rotational orientation, to a second position, at a second rotational orientation. A complete cycle of operations can, of course, include a sequence of such procedures accommodating, for example, multiple product pick up operations followed by one or more product placement operations. In this respect, it will be understood that the operational sequences are a function of a particular task or tasks to be performed on a repetitive basis.

Although the apparatus of the invention is of a highly simplified and modularized construction, it nevertheless is capable of forming complex, precision functions usually heretofore reserved for complex, expensive robotic apparatuses.

The apparatus of the invention is of elegant simplicity, in that it can be assembled from a variety of highly standardized, easily fabricated components to perform the most complex tasks. For example, the principal linear axis supports may be formed of channel members, cut to appropriate length and provided with a standardized form of roller guide track. A simplified carriage arrangement, comprising a basic carriage plate and a plurality of sets of adjustably mounted guide rollers, can be quickly fabricated for guided movement along a linear channel member. The guided carriage plate may mount additional linear channel members, a rotary manipulator device or the like, depending upon end use requirements.

Contributing to the overall ease and simplicity of providing a highly customized, sophisticated robotic device at minimum expense, is the arrangement of discontinuous gear belts for driving the linear axis carriages along their respective supporting channels. The drive system may thus be quickly assembled and installed, regardless of the customized length of the linear support channels. The robotic apparatus of the invention, because of its highly modularized, easily customized construction, enables the use of robotic equipment to be extended to many tasks heretofore performed manually, because of the high cost of more conventional robotic equipment.

It will be appreciated, of course, that the robotic apparatus of the invention need not be configured orthographically, along X-Y-Z axes, as specifically illustrated herein. Indeed, more or fewer axes of motion may be utilized. Moreover, the axis of a given linear support member does not have to be disposed at right angles to the member from which it is supported, but can extend at any angle. Among other things, a succession of channel supports may be stacked one from the other, each to extend in the same direction, forming in effect a telescopic assembly of elements. In such cases, it is possible to nest a series of progressively smaller channel elements one within the other. It will be understood from these examples that the basic constructional features of the present invention can be employed in an extremely wide variety of robotic structures.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A multi-axis robotic apparatus operational along at least first, second and third axes and which comprises
   (a) first, second and third channel-like support members elongated in the direction of said respective first, second and third axes and each defining a confined space and having an open side,
   (b) first, second and third pairs of spaced-apart track strips carried respectively by each said first, second and third support members, at the open sides thereof, and extending in parallel relation in the direction of said respective axes, (c) first, second, and third carriage plates movable respectively along said first, second and third track strips in the direction of said first, second and third axes respectively, (d) a plurality of sets of guide wheels mounted on each of said carriage plates and arranged for rolling engagement with respective pairs of said spaced-apart track strips at a plurality of locations to rigidly support said carriage plates for guided movement along said respective axes, (e) first, second and third rotary drive motors respectively mounted externally on each of said support members, in fixed relation thereto, and respectively having first, second, and third drive shafts projecting into the confined space defined by the respective support member on which it is mounted and mounting, within said space, first, second, and third drive sprockets, respectively, (f) first, second and third gear belts driven by each of said respective drive motors, guided for movement within the confined space of each respective support member, and connected to the respective carriage plate guided by said respective support members, for controllably moving and positioning said respective carriage plate along its respective axis of motion, (g) first, second and third idler sprockets mounted in each of said first, second and third support members, said second and third idler sprockets being mounted adjacent the ends of the second and third support members opposite from said respective second and third drive motors, and their respective drive sprockets, (h) said gear belts being of discontinuous construction and being trained about the respective idler sprockets associated with each said support member, and said second and third gear belts also being trained about the respective second and third drive sprockets, (i) tension post means fixed to each of said carriage plates and projecting into the confined space of the associated support member, (j) the opposite ends of each of said respective gear belts being adjustably gripped by the tension post means associated therewith, whereby said carriage plates may be controllably displaced along their respective support members by said drive motors, (k) said second and third support members being readily removably mounted by said first and second carriage plates respectively, and (l) transport means mounted on said third carriage plate for carrying an element to be transported.

2. Apparatus according to claim 1, further characterized by, (a) said transport means comprising a rotary mechanism carried by said third carriage plate and including a fourth drive motor mounted on said third carriage plate for actuating said rotary mechanism about a fourth axis, (b) said third channel-like support member having an elongated, slot-like opening extending along the side thereof opposite the open side thereof, and (c) a portion of said rotary mechanism projecting through said slot-like opening.

3. Apparatus according to claim 2, further characterized by, (a) said transport means includes a mounting plate carried on one side of said third carriage plate, (b) said fourth drive motor being mounted on said third carriage plate on the side thereof opposite to said mounting plate, and (c) said portion of said rotary mechanism projecting through said slot-like opening comprising portions of said fourth drive motor.

4. Apparatus according to claim 1, further characterized by (a) said first channel-like support member being vertically oriented and said first carriage plate mounted thereon being guided for vertical movement and carrying said second and third channel-like members, (b) the first drive shaft also mounting the first idler sprocket, rotatable with respect thereto, (c) a further shaft mounted adjacent the end of said first support member opposite said first drive motor, (d) said further shaft being rotatable with respect to said first support member and having fixed thereto a first driven sprocket of larger diameter than said first drive sprocket and a second driven sprocket of smaller diameter than said first driven sprocket, (e) said first gear belt being trained about said first idler sprocket and said second driven sprocket, and (f) a fourth gear belt trained about said first drive sprocket and said first driven sprocket.

* * * * *